United States Patent Office.

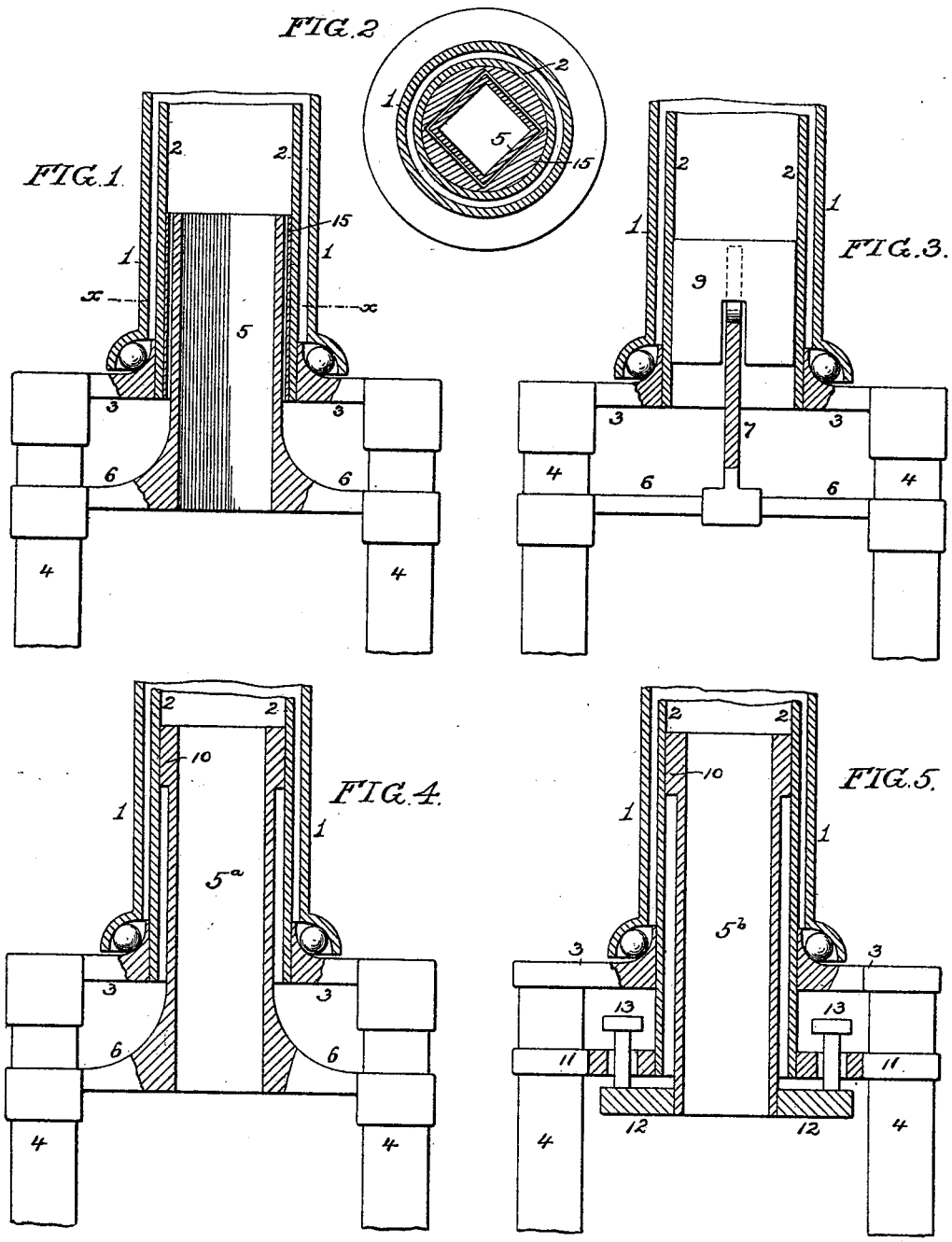

CHARLES J. RUSSELL AND WILLIAM S. LIMING, OF PHILADELPHIA, PENNSYLVANIA.

CONSTRUCTION OF STEERING-FORKS FOR BICYCLES.

SPECIFICATION forming part of Letters Patent No. 623,832, dated April 25, 1899.

Application filed February 14, 1898. Serial No. 670,206. (No model.)

*To all whom it may concern:*

Be it known that we, CHARLES J. RUSSELL and WILLIAM S. LIMING, citizens of the United States, and residents of Philadelphia, Pennsylvania, have invented certain Improvements in the Construction of Steering-Forks of Bicycles, of which the following is a specification.

The object of our invention is to provide an auxiliary stem combined with the tubular steering post and fork of a bicycle in such manner that it is normally free from the strain imposed upon the fork and its crown and will in case of breakage of the fork prevent collapse of the front portion of the bicycle and the serious injury likely to result to the rider from such collapse. This object we attain in the manner hereinafter set forth, reference being had to the accompanying drawings, in which—

Figure 1 is a sectional view, on an enlarged scale, of sufficient of a bicycle to illustrate our invention. Fig. 2 is a sectional plan on the line $x\ x$, Fig. 1; and Figs. 3, 4, and 5 are sectional views illustrating other means of carrying out our invention.

In Fig. 1 part of the head of the fixed frame of a bicycle is represented at 1 and part of the tubular steering-post at 2, this post being connected at the lower end to a yoke 3, which is secured to the upper ends of the opposite legs 4 4 of the front fork of the machine and has a ball-bearing in the lower end of the head 1. The breaking of this yoke or of the equivalent crown connection between the steering-post 2 and the opposite legs 4 of the front fork of the machine is not an infrequent occurrence, and an accident of this character is almost invariably followed by the collapse of the front portion of the bicycle and consequent severe injury to the rider. It is the aim of our invention to overcome this objection, and this object we effect by providing an auxiliary stem which is free from contact with the steering-post at the crown of the fork, and is therefore likewise free from the vibration and strain which are exerted upon said crown and steering-post at and near the point of junction and which are in most cases the cause of breakage at that point.

In that embodiment of our invention shown in Fig. 1 the auxiliary stem consists of a tube 5, projecting up into the steering-post 2, but free from contact therewith, the lower end of said tube being connected to a yoke 6, which is secured at its opposite ends to the opposite legs 4 of the steering-fork at a point below the connections of the yoke 3. Hence if the said yoke or the steering-post adjacent thereto is broken the tube 5 comes into play, and thus prevents collapse of the forward portion of the bicycle. The tube 5 is preferably of oval or polygonal form, and the steering-post 2 has at the lower end an internal sleeve 15 with opening of corresponding shape, but somewhat larger size, as shown, for instance, in Fig. 2, whereby the movement of the front fork can be controlled through the medium of the tube 5 when the latter comes into play, so that the machine is always under the control of the rider.

In Fig. 3 we have shown an embodiment of our invention in which in place of the tube 5 we employ an auxiliary stem in the form of a bar 7, extending up into the steering-post 2 and slotted for engagement with a slotted plate 9, secured within said steering-post at right angles to the bar 7, so that in case of breakage of the fork-crown or lower end of the steering-post the slotted bar 7 and plate 9 will come into engagement and will provide a connection between said steering-post and the fork.

In Fig. 4 we have shown an embodiment of our invention in which a tube $5^a$ extends up into the steering-post and has an enlarged head 10 secured within said steering-post, the tube, however, being free from contact with the steering-post at the crown of the fork, and in Fig. 5 we have shown still another embodiment of our invention in which a tube $5^b$, secured at its upper end within the steering-post 2, projects down to a point below the lowermost bar or yoke 11 of a double-crown fork and has at its lower end a plate 12 with pins 13 projecting upwardly through openings in said lower bar, the openings being preferably larger than the pins, so that the vibration of the bar 11 is not transmitted to the plate 12 and tube $5^b$, the pins 13, however, serving to retain the fork under control of the steering-post when the main crown connection between said fork and steering-post is broken and the tube 5ᵇ comes into play.

Having thus described our invention, we claim and desire to secure by Letters Patent—

1. The combination of the steering-post and front fork of a bicycle, with an auxiliary stem carried by one of said parts and projecting into position to engage with the other, but normally free from engagement therewith, substantially as specified.

2. The combination of the steering-post of a bicycle, the opposite legs of the front fork, and one or more yoke-bars connecting the legs of said fork to the steering-post, with an auxiliary stem between the steering-post and the fork, said stem being carried by one of said parts and projecting into the other but normally free from engagement therewith, substantially as specified.

3. The combination of the steering-post and front fork of a bicycle, with an auxiliary stem extending up into the steering-post but free from contact therewith at the crown of the fork, substantially as specified.

In testimony whereof we have signed our names to this specification in the presence of two subscribing witnesses.

CHARLES J. RUSSELL.
WILLIAM S. LIMING.

Witnesses:
JOS. H. KLEIN,
FRANK E. BECHTOLD.